United States Patent

Kapich

[11] Patent Number: 5,577,385
[45] Date of Patent: Nov. 26, 1996

[54] ELECTROPNEUMATIC ENGINE SUPERCHARGER SYSTEM

[76] Inventor: Davorin D. Kapich, 3111 Serrano Dr., Carlsbad, Calif. 92009

[21] Appl. No.: 526,593

[22] Filed: Sep. 11, 1995

[51] Int. Cl.⁶ .................................................... F02B 37/00
[52] U.S. Cl. .......................... 60/612; 123/565; 417/406
[58] Field of Search .............................. 60/607, 608, 612; 123/565

[56] References Cited

U.S. PATENT DOCUMENTS

| 2,710,521 | 6/1955 | Nettel | 60/608 |
| 5,207,063 | 5/1993 | Blake | 60/612 |

FOREIGN PATENT DOCUMENTS 57-212331  12/1982  Japan ............................ 123/565

Primary Examiner—Michael Koczo
Attorney, Agent, or Firm—John R. Ross

[57] ABSTRACT

An electro pneumatic supercharger system for charging air into an internal combustion engine. An electropneumatic supercharger is driven by an electric motor and an air turbine. The supercharger compressor provides supercharger air to a turbocharger. The turbocharger is driven by exhaust gasses from the engine and the turbocharger compressor provides compressed air to the engine and also provides compressed air to drive the supercharger air turbine. In a preferred embodiment, when excess turbocharger power is available, the electric motor may be driven by compressed air from the turbocharger to charge a battery.

7 Claims, 5 Drawing Sheets

ELECTROPNEUMATIC ENGINE SUPERCHARGER SYSTEM

This invention relates to internal combustion engine equipment and especially to superchargers for such engines.

BACKGROUND OF THE INVENTION

New stringent diesel emission regulations have had the effect of limiting the acceleration rates of turbodiesel powered vehicles. A need for supercharging of turbodiesel engines to improve their performance in the low RPM range has been recognized by most turbodiesel engine manufacturers and users. Positive displacement superchargers, such as well known Roots type and rotary type blowers driven directly by the engine via speed increasing gear trains have been utilized by major turbodiesel manufacturers. Fixed gear ratio mechanical superchargers suffer from four very undesirable features which are:

1) supercharger speed cannot practically be controlled independently of engine speed, 2) a fixed gear ratio mechanical supercharger proportions the engine intake air flow closely to the engine speed regardless of the engine load, thus the supercharger is not able to achieve the optimum air flow to fuel ratio at all engine loads, 3) a mechanical clutch is required to disconnect the blower from the engine when not needed which result in an abrupt change in boost, and 4) the positive displacement blower blocks the air flow through it when disconnected from the engine.

The applicant has been issued U.S. Pat. No. 5,421,310 for a hydraulic supercharging system utilizing a miniature, very high speed hydraulic turbine driving a compact centrifugal compressor to supercharge a turbocharged engine. The advantage of this system is its ability to modulate the supercharger speed independently of the engine speed and thus achieve the optimum boost and air/fuel ratio at most engine loads and speeds. It utilizes a "stand alone" relatively simple hydraulic system incorporating the bearings lubrication and seals functions. This hydraulic supercharging system does, however, require a separate fluid system which may be undesirable is some applications.

What is needed is a system which provide some of the advantages of the hydraulic system without need of a separate fluid system.

SUMMARY OF THE INVENTION

The present invention provides an electropneumatic supercharger system for charging air into an internal combustion engine. An electropneumatic supercharger is driven by an electric motor and an air turbine. The supercharger compressor provides supercharger air to a turbocharger. The turbocharger is driven by exhaust gasses from the engine and the turbocharger compressor provides compressed air to the engine and also provides compressed air to drive the supercharger air turbine. Preferably, the larger portion of air discharging from the turbocharger compressor is conventionally intercooled and is then supplied to the engine intake manifold. Under certain low engine RPM conditions up to ⅓ of the total turbocharger compressor air flow is supplied to the air turbine which in combination with a high speed electric motor is driving the supercharger blower. Preferably, a control valve in the air turbine supply line controls the amount of flow admitted to the air turbine from the turbocharger compressor discharge. In the low engine RPM range when the engine suffers from a lack of power, the electric motor initially provides most of the power needed to accelerate the supercharger which in turn increases the boost into the inlet of the turbocharger compressor and further on exponentially into the engine air box. This allows for more fuel to be combusted, which in turn increases sharply the turbocharger turbine output which drives the turbocharger compressor. The engine thermodynamic cycle analysis shows that substantial amount of the compressor discharge air flow can be diverted at this point into the air turbine driving the blower, which in turn lowers the electrical power consumption of the high speed electric motor drive. The turbocharger power balance analysis shows additional increase in the pressure drop across the engine with the electropneumatic supercharging which generally has a very positive effect on the efficiency of air scavenging into the engine cylinders. In a preferred embodiment for charging a 4 Liter turbodiesel engine, the engine net power at 1300 RPM increases by the electropneumatic supercharger action to 105 HP, as compared to 60 HP for turbocharged engine only. In this preferred embodiment a 2 horsepower brushless 24 Volts DC electric motor is used in conjunction with a 5 horsepower radial inflow impulse air turbine mounted on the common shaft and operating at 31,500 RPM. The blower and the turbine blades may be solidly attached to an integral wheel with 5.0 inch diameter in a manner similar to the design shown in the U.S. Pat. No. 5,427,508 issued on Jun. 7, 1995 which is incorporated herein by reference. In a preferred embodiment when excess turbocharger power is available, the electric motor may be driven by compressed air from the turbocharger to charge a battery.

DETAILED DESCRIPTION OF THE PREFERRED EMBODIMENT

Electropneumatic Engine Supercharging System

Figure 1:
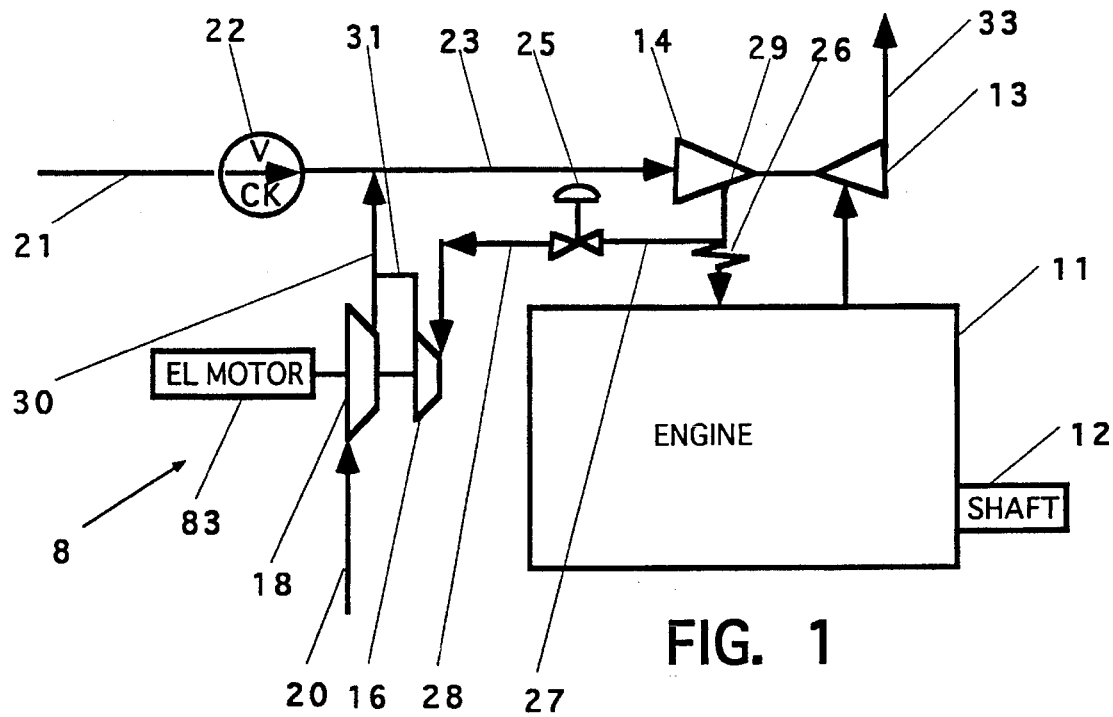
FIG. 1 shows a layout of the electropneumatic supercharging system according to the present invention.

FIG. 1 shows a referred embodiment of the present invention. Engine 11 is a standard 4 liter diesel engine producing useful mechanical power via drive shaft 12. The ambient air needed for the combustion is supplied via inlet line 20 into the supercharger compressor 18 of supercharger 8 which is driven by electric motor 83 or air turbine 16 or both. The compressed air produced in supercharger compressor 18 is further transported via supercharger compressor discharge line 30 and supply line 23 into the turbocharger compressor 14, where it undergoes a second stage compression and is discharged via pipe 29 and air intercooler 26 into the engine 11. Following a conventional combustion process inside engine 11, the engine 11 exhaust gases at higher than ambient pressure and temperature are fed into the turbocharger turbine 13 producing useful work in the turbocharger turbine 13 which drives directly the turbocharger compressor 14. The turbocharger turbine 13 exhausts into the ambient via exhaust pipe 33.

Air line 21 and check valve 22 allow under certain operating conditions for portion of the engine air to bypass the supercharger compressor 18 when the air pressure in the supply line 23 falls below the ambient pressure. When supercharger compressor 18 is producing pressure rise, the check valve 22 shuts off automatically preventing the air flow to reverse through the air line 21. A portion of the compressed air discharged from the turbocharger compressor 14 is, under certain engine operating conditions, supplied to the air turbine 16 via compressed air line 27, flow control valve 25 and air line 28. After performing useful work in the air turbine 16 the air flow is returned to the supercharger compressor discharge line 30 via air line 31. The power supplied by the air turbine 16 is augmented by the electric motor 83 driving the supercharger compressor 18 by a common shaft.

Operation in the Low Engine RPM Range.

At low engine RPM, assistance of supercharger compressor 18 is required to increase the air pressure into the inlet of the turbocharger compressor 14, which substantially increases the charge air pressure into the engine 11 due to the two stage compression. Initially, the flow control valve 25 is closed and electric motor 83 is providing all the power to the supercharger compressor 18. Sudden increase in the air flow density into the engine allows for a proportional increase of the fuel flow into the engine, resulting in almost immediate increase in engine power. Almost immediately, the pressure ratio and the energy content of the engine exhaust gas flow is greatly increased due to the two stage compression and increased fuel combustion. This provides the turbocharger turbine 13 with an excess power over that required by the turbocharger compressor 14 and allows for the flow control valve 25 to open admitting the surplus compressed air into the air turbine 16. The power generated by the air turbine 16 allows for a substantially reduced power required from the electric motor 17, thus essentially "bootstrapping" the overall supercharging/turbocharging system to the increased power of the turbocharger turbine 13. The air flow through the turbocharger compressor 14 increases substantially over the air flow admitted to the engine 11 due to the amount of the air flow being recirculated through the air turbine 16. This has a very beneficial effect on the efficiency and flow stability of the turbocharger compressor 14 due to increased surge margin, which is well known requirement of a typical centrifugal flow turbocharger compressor operating in the low engine RPM range.

Operation in the Intermediate and High Engine RPM Range

Figure 4:
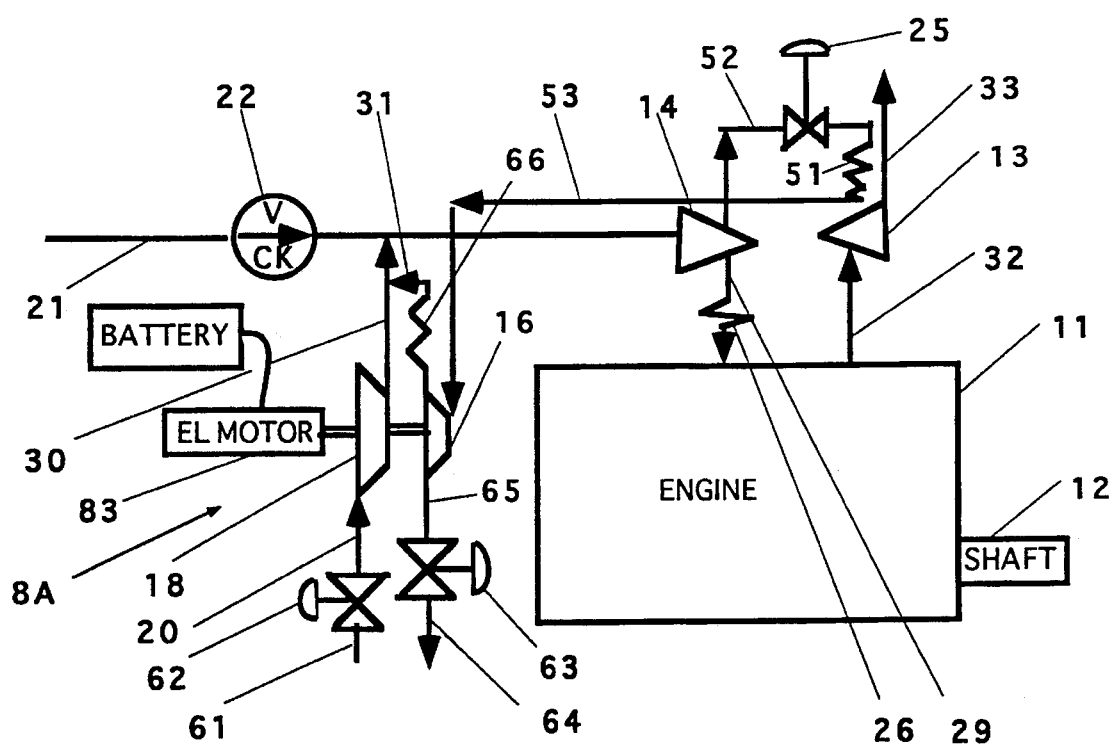
FIG. 4 shows a modified version of the device in FIG. 3 to provide for electric generation.
Figure 5:
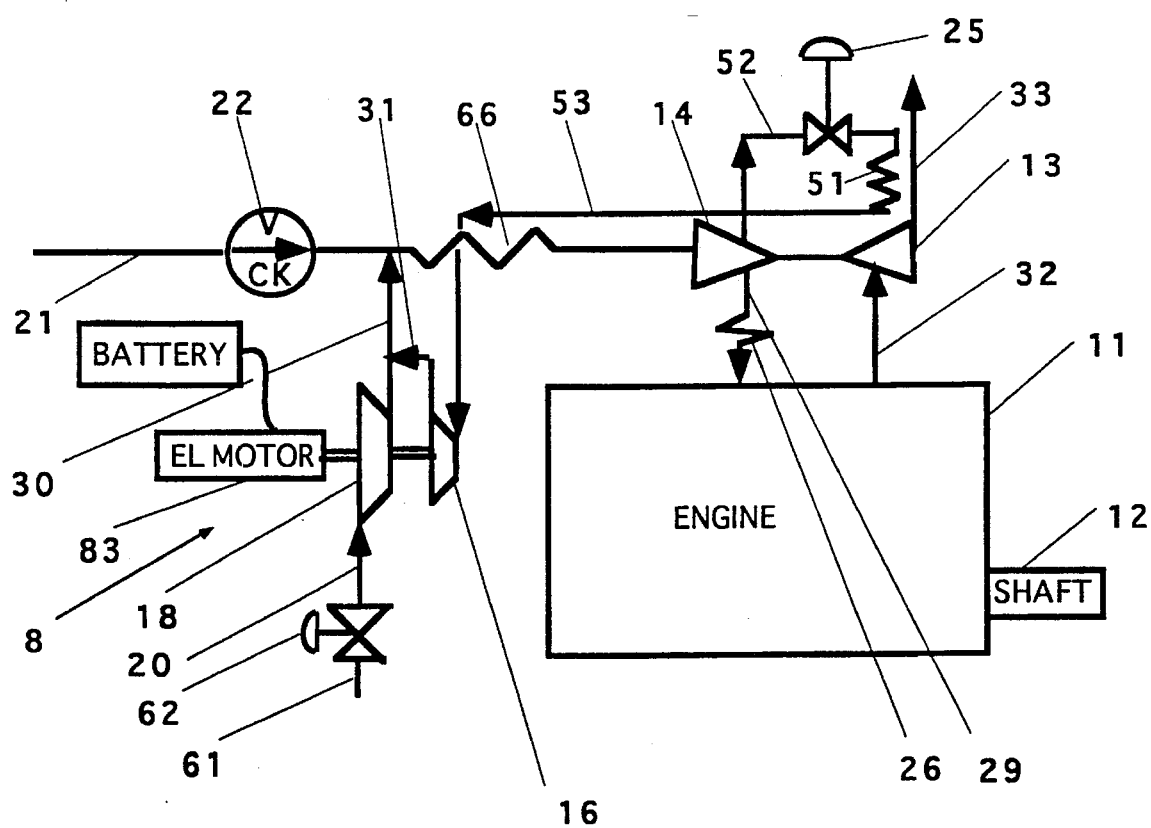
FIG. 5 shows a modified version of the device in FIG. 4.

Increased engine RPM produces higher and higher energy content available to the turbocharger turbine 13 and the need for supercharging the inlet of the turbocharger compressor 14 decreases. The electric power supplied to the electric motor 83 is decreased greatly; therefore, use of the electric motor 83 can be reversed to serve as an electric generator charging the electric supply system used to energize the electric motor 83. Preferred arrangements for doing this efficiently are shown in FIGS. 4 and 5.

System Parameters For a Typical 4 Liter Turbo Diesel

A thermodynamic analysis of the engine power cycle indicates that the use of the present invention system will increase the net power output of a commercially available 4 Liter turbodiesel by 80% at 1200 RPM, 70% at 1500 RPM, 40% at 1700 RPM. When the engine reaches 2400 RPM the turbocharger alone is sufficient to produce required power. The power ratings could be increased further over the entire engine RPM range if additional increase in the engine cylinder maximum gas pressures can be achieved. For this particular application, the supercharger compressor 18 and the air turbine 16 are of integral aluminum construction with a common wheel diameter of 5.0 inch. The electric motor is a commercially available, 2.0 HP, 31,500 RPM, brushless, 24 Volts DC motor which can operate also as an electric generator.

The following table shows some of the key engine parameters at different engine speeds. Values shown in parentheses are equivalent values for a turbocharged diesel engine with no supercharging. Note especially, the effects of the supercharger on engine horsepower and turbocharger turbine power:

| Engine Speed (RPM) | 1300 | 1500 | 2200 | 3800 |
|---|---|---|---|---|
| Engine Power (HP) | 105(55) | 120(75) | 160(150) | 230(230) |
| Supercharger Press. Ratio | 1.35(1.0) | 1.3(1.0) | 1.1(1.0) | 1.0(1.0) |
| Turboch. Compr. Press. Ratio | 1.87(1.19) | 2.02(1.48) | 2.38(2.2) | 2.04(2.04) |
| Engine Air Flow (lb/min) | 14.76(7.1) | 16.87(9.5) | 22.5(21) | 32.4(32.4) |
| Turbo. Compr. Air Flow (lb/min) | 23.6(7.1) | 25.5(9.5) | 29.0(21) | 32.4(32.4) |
| Air Turbine Air Flow (lb/min) | 8.85 | 8.6 | 6.5 | 0 |
| Air Turbine Power (HP) | 4.35 | 4.3 | 1.9 | 0 |
| Electric Motor Power (HP) | 1.3 | 1.3 | 0.75 | 0 |
| Engine Exhaust Temp. (deg. F) | 1100 | 1100 | 1100 | 1100 |
| Engine Press. Diff. (psid) | 4.2(1.0) | 3.5(1.7) | 2.0(2.0) | 2.0(2.0) |
| Turboch. Turbine Power (HP) | 21.6(1.5) | 25.0(4.7) | 29.7(25.2) | 30.1(30.1) |

Alternate System Configurations

Check valve 22 and inlet pipe 21 could be left off. In this case the supercharger compressor 18 is designed to handle the entire engine 11 air flow at all engine 11 operating conditions.

Figure 2:
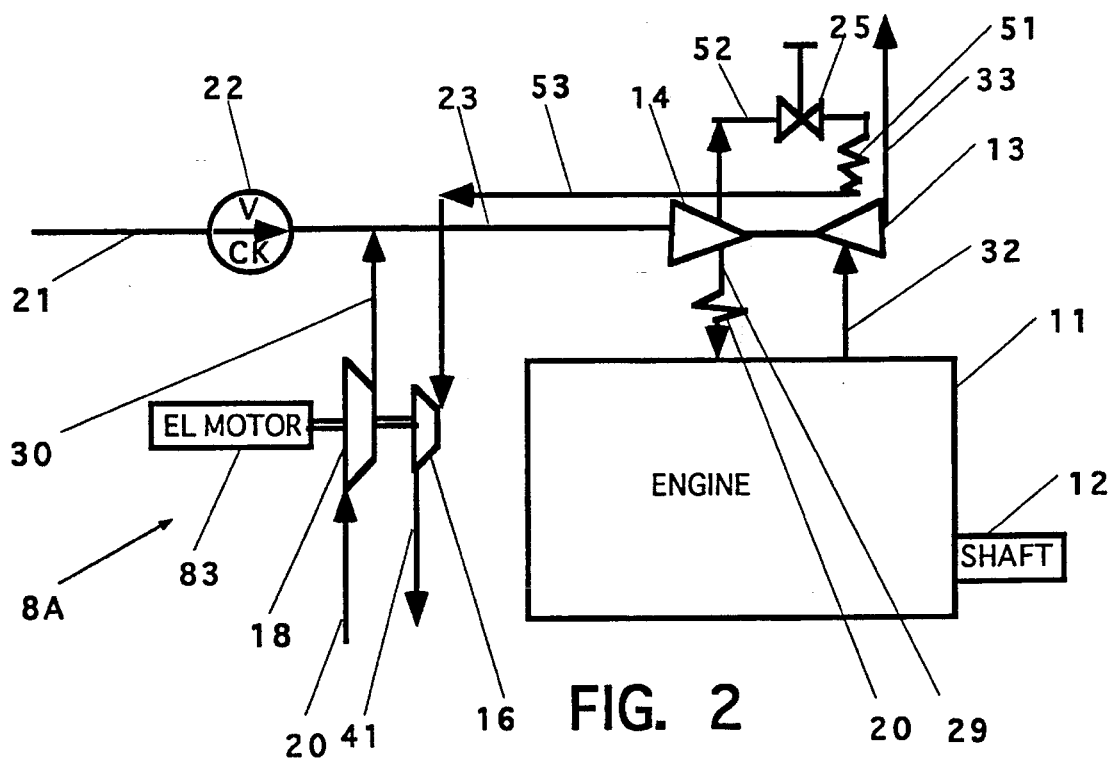
FIG. 2 shows a modified version of the device in FIG. 1.

FIG. 2 shows FIG. 1 basic configuration except for the air turbine 16 air flow being heated in the heat exchanger 51 by the turbocharger turbine 13 exhaust gas flow for purpose of increasing the energy content of air driving the air turbine 16 which exhausts the air into the ambient via pipe 41.

Figure 3:
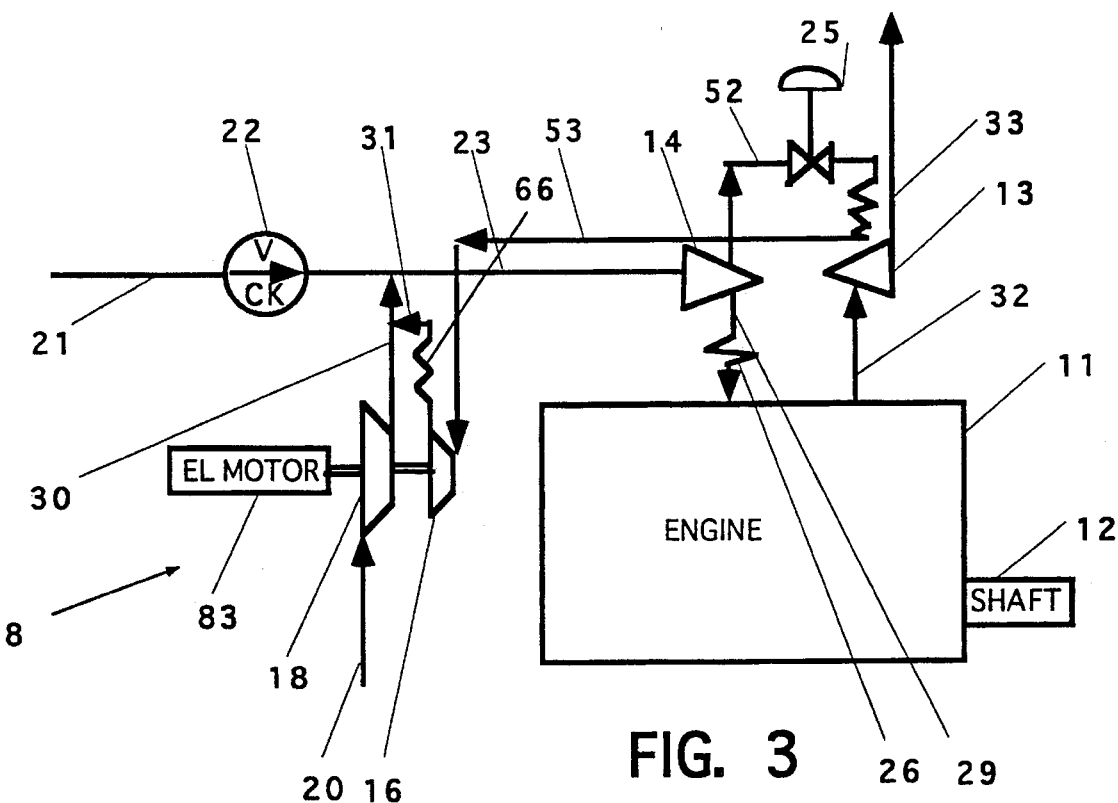
FIG. 3 shows a modified version of the device in FIG. 2.

FIG. 3 shows FIG. 2 basic configuration except for the addition of the air precooler 66 cooling the air flow exiting air turbine 16 and the elimination of pipe 41.

Electric Generation

FIG. 4 shows FIG. 3 basic configuration except for the addition of valve 63 and valve 61 for specific functions during the electric power generating mode of operation. During the high speed engine operation, when the turbocharger turbine 13 power is high and the supercharging assistance is not needed, valve 62 shuts off the air flow into the supercharger compressor 18 of supercharger 8A in order to minimize its power consumption. Under such conditions valve 25 and valve 63 open allowing air turbine 16 to exhaust into the ambient. The horsepower loss of the windmilling supercharger compressor 18 is minimized as it is generally known by 1) shutting of the mass air flow through its impeller and 2) by the lower density air due to subatmospheric pressure created by the compressor impeller action. When the power produced by the air turbine 16 exceeds the power absorbed by the shut down supercharger compressor 18 the electric motor 83 reverses its function to become an electric generator charging the electric batteries of the vehicle. When supercharging is needed, which occurs generally during the low RPM engine acceleration under the load, valve 62 opens and valve 63 closes and electric motor 83 reverses its function from being a electric generator to being an electric motor. FIG. 5 shows the FIG. 4 basic configuration with exception of line 65, line 64 and valve 63 being eliminated, thus forcing the entire air turbine 16 exhaust air to mix with the incoming fresh air entering via line 21 and being further downstream cooled by the intercooler 66 prior to entering the turbocharger compressor 14.

Electropneumatic Supercharger Designs

Figure 6:
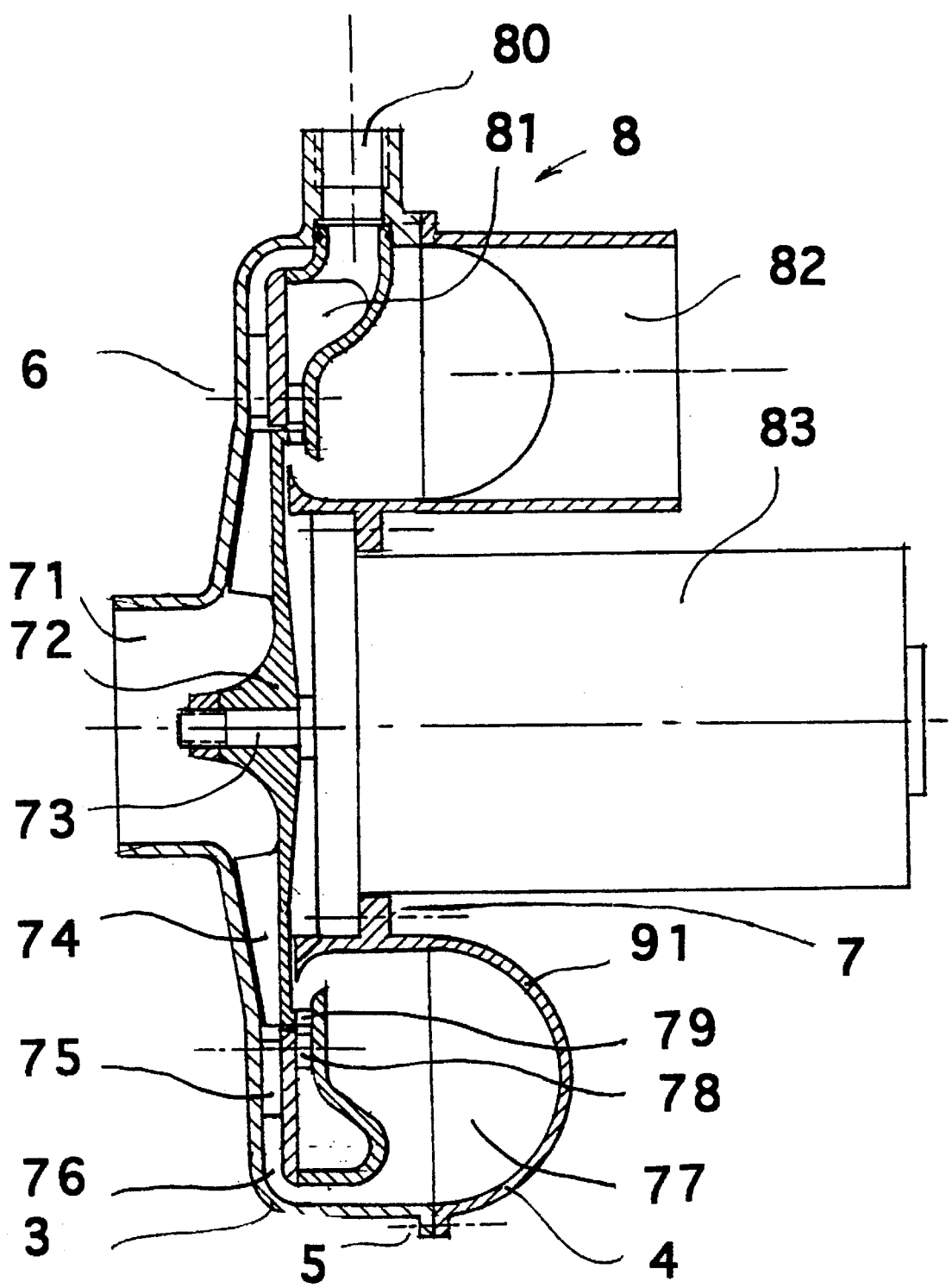
FIG. 6 shows a layout of a preferred electropneumatic supercharger.

FIG. 6 shows an embodiment of an electropneumatic supercharger 8 that is preferred for the electropneumatic supercharger systems shown in FIGS. 1, 3 and 5. Electric motor 83 is a 1.5 HP, 30,000 RPM, brushless DC motor such as is commercially available from suppliers like MFM Technology, Inc., Ronkokoma, N.Y.; EG&G Rotron Motor Division, Woodstock, NY; Montevideo Technology, Inc., Montevideo, Minn. Supercharger 8 comprises a housing 91, comprising a generally toroidal shaped exhaust duct 77 with a 2 ½inch diameter exhaust pipe 82 and inlet pipe 71. Inlet pipe 71 in FIG. 6 corresponds to inlet line 20 in FIGS. 1, 3 and 5. Exhaust pipe 82 in FIG. 6 corresponds to discharge line 30 in FIGS. 1, 3 and 5. Air line 31 shown in FIGS. 1, 3 and 5 is contained internally to toroidal housing 91 discharging air from the turbine rotor blades 79 directly into exhaust duct 77 where it mixes freely with compressor exhaust flow discharging into exhaust duct 77 via diffuser exhaust passage 76. Housing 91 is divided into a front part 3 and a back part 4 and is joined by bolts at location 5. Electric motor 83 is attached to housing 91 with multiple bolts as shown at 7. Supercharger compressor-turbine wheel 72 is mounted on the ⅜ inch diameter external extension of motor shaft 73. Wheel 72 is preferably cast in a single aluminum cast and has a diameter of 5 inches. It comprises 12 compressor blades 74 and 82 turbine blades 79. Turbine blades 79 are intentionally made small in order to minimize turbine windage losses when the supercharger is driven by the motor. Compressed air flow driving turbine blades 79 enters through ¾ inch diameter turbine inlet channel 80 into the turbine volute 81 flowing further on into nozzle passages formed by 16 nozzle vanes 78 positioned at 15 degrees relative to the tangent to the turbine blade 79 circle where it expands and gains kinetic energy and drives turbine blades 79 by well known principals governing the operation of impulse turbines. Turbine blades 79 height is 0.20 inch and is based on the optimum efficiency design correlation for such full admission radial inflow impulse turbine. The four machine screws at location 6 are threaded into nozzle vanes 78 and passing through compressor diffuser vanes 75 firmly attach turbine inlet volute 81 to the front part of part 3. Turbine inlet channel 80 is connected flow-wise to air line 28 in FIG. 1 and to air line 53 in FIGS. 3 and 5.

Figure 7:
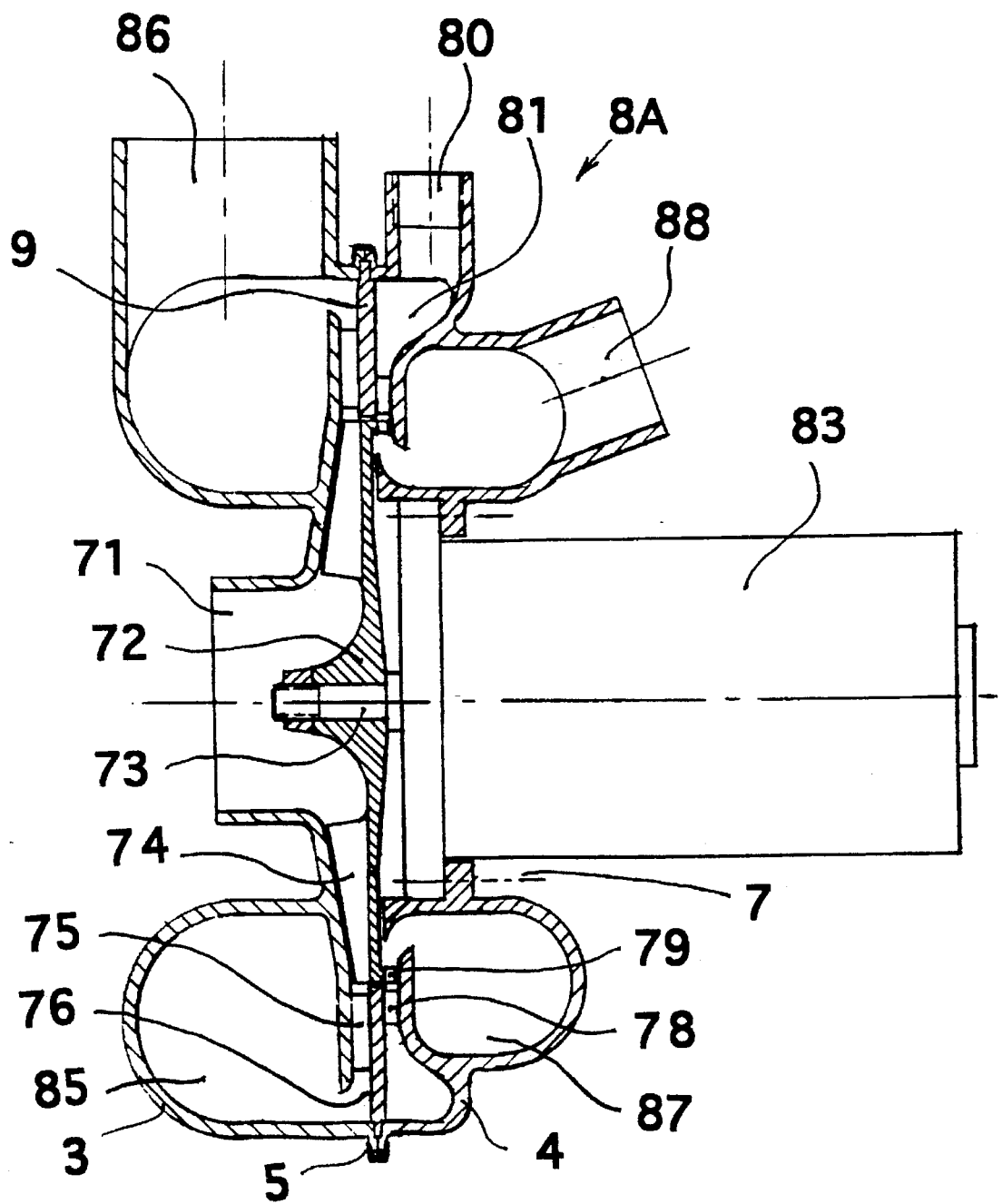
FIG. 7 shows a layout of a second preferred electropneumatic supercharger.

FIG. 7 shows a preferred embodiment an electropneumatic supercharger 8A applicable to the systems shown in FIGS. 2 and 4. The FIG. 7 design is very similar to the FIG. 6 design except the turbine exhaust flow and the compressor exhaust flow are not mixed internally with the flow in exhaust duct 77. The turbine exhausts through turbine exhaust passage 88 and the compressor discharges through the compressor exhaust passage 86. The front part 3 and the back part 4 are held solidly together with a commercial "V" band clamp. Radial plate 9 with integral nozzle vanes 78 and diffuser vanes 75 is clamped in between front part 3 and back part 4, thus eliminating the need for the machine screws attachment at the location 6 in FIG. 6. Turbine exhaust passage 88 is connected flow-wise with pipe 41 shown in FIG. 2 and with line 65 in FIG. 4.

Flow Requirements

The supercharging air flow requirements of the present invention are similar to those established for a hydraulic supercharging system patented by Applicant in U.S. Pat. No. 5,421,310 issued Jun. 6, 1995 with the exception that the hydraulic power supply has been substituted by the electric and pneumatic power applied in a combined fashion to drive the supercharger. Substituting the hydraulic system with the combined air turbine/electric motor system increases the cost over the hydraulic turbine driven supercharger by approximately 40% and decreases the supercharger net driving power extracted from the engine by approximately 50%. Depending on the duty cycle of the particular engine application the electro pneumatic system becomes more advantageous where the lower fuel consumption is major concern over the initial supercharger system costs.

Although the above description contains many specificities, these should not be construed as limiting the scope of the invention but as merely providing illustrations of some of the presently preferred embodiments of this invention. For example, a great variety of engines would benefit from such a supercharging system. The sizes of the individual items within the system should be chosen to provide the desired service. Thus, the scope of the invention should be determined by the appended claims and their legal equivalent, rather than by the examples given.

I claim:

1. An electro pneumatic supercharger system for charging air into an internal combustion engine, said system comprising:

A) an electro pneumatic supercharger comprising a first air compressor on a single shaft, said single shaft being driven by an electric motor and an air turbine, B) a turbocharger comprising an exhaust gas turbine driven by exhaust gasses from said engine and a second air compressor defining a second air compressor air inlet and providing compressed air to said engine and to said air turbine; wherein air compressed by said first air compressor is directed to said second air compressor air inlet.

2. An electropneumatic supercharger system as in claim 1 and further comprising a valve means for controlling the compressed air flow from said second air compressor to said air turbine.

3. An electro pneumatic supercharger system for charging air into an internal combustion engine, said system comprising:

A) an electro pneumatic supercharger comprising a first air compressor on a single shaft, said single shaft being driven by an electric motor and an air turbine, B) a turbocharger comprising an exhaust gas turbine driven by exhaust gasses from said engine and a second air compressor providing compressed air to said engine and to said air turbine, and C) a heat exchanger means for heating with engine exhaust gasses the compressed air flow from said second air compressor to said air turbine.

4. An electro pneumatic supercharger system for charging air into an internal combustion engine, said system comprising:

A) an electro pneumatic supercharger comprising a first air compressor on a single shaft, said single shaft being driven by an electric motor and an air turbine, B) a turbocharger comprising an exhaust gas turbine driven by exhaust gasses from said engine and a second air compressor providing compressed air to said engine and to said air turbine, wherein compressed air discharged from said air turbine is discharged into said second air compressor.

5. An electro pneumatic supercharger system for charging air into an internal combustion engine, said system comprising:

A) an electro pneumatic supercharger comprising a first air compressor on a single shaft, said single shaft being driven by an electric motor and an air turbine, B) a turbocharger comprising an exhaust gas turbine driven by exhaust gasses from said engine and a second air compressor defining a second air compressor air inlet and providing compressed air to said engine and to said air turbine, and C) a battery means to provide electric power to said electric motor, said electric motor being configured to charge said battery means when sufficient energy is available in the compressed air flow from said second air compressor to said air turbine.

6. An electropneumatic supercharger system as in claim 5 and further comprising a valve means for controlling intake air into said first air compressor.

7. An electropneumatic supercharger system as in claim 6 and further comprising an air turbine exhaust valve means to permit said air turbine to exhaust all or a portion of its exhaust into ambient air.

* * * * *